(No Model.) 3 Sheets—Sheet 1.

A. A. FAUST.
CORN HARVESTER.

No. 420,679. Patented Feb. 4, 1890.

WITNESSES:
Chas. Nida
C. Sedgwick

INVENTOR:
A. A. Faust
BY Munn & Co
ATTORNEYS.

(No Model.) 3 Sheets—Sheet 3.

A. A. FAUST.
CORN HARVESTER.

No. 420,679. Patented Feb. 4, 1890.

WITNESSES:

INVENTOR:
A. A. Faust
BY Munn & Co
ATTORNEYS.

UNITED STATES PATENT OFFICE.

ADOLPH A. FAUST, OF HAROLD, (DAKOTA TERRITORY,) SOUTH DAKOTA, ASSIGNOR OF ONE-THIRD TO WILLIAM H. W. PAGE, OF SAME PLACE.

CORN-HARVESTER.

SPECIFICATION forming part of Letters Patent No. 420,679, dated February 4, 1890.

Application filed December 23, 1887. Serial No. 258,820. (No model.)

*To all whom it may concern:*

Be it known that I, ADOLPH A. FAUST, of Harold, in the county of Hughes and Territory of Dakota, have invented a new and useful Improvement in Corn-Harvesters, of which the following is a full, clear, and exact description.

My invention relates to an improvement in machines for harvesting corn, and has for its object to provide a light easy-running machine, which will be at all times under the control of the operator, and in which the cutters and the whole frame may be raised or lowered while in motion.

The invention consists in the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1:
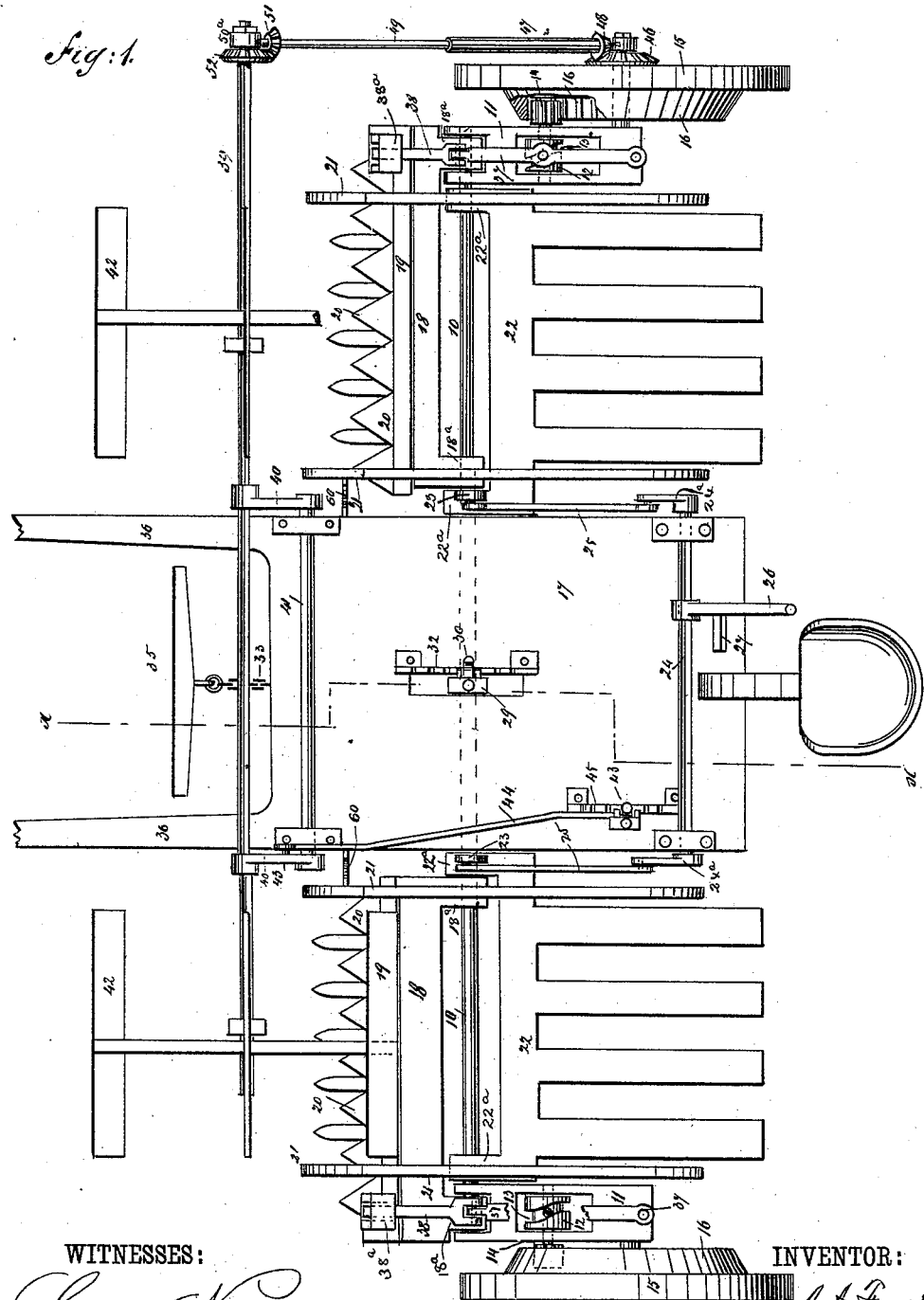
Figure 2:
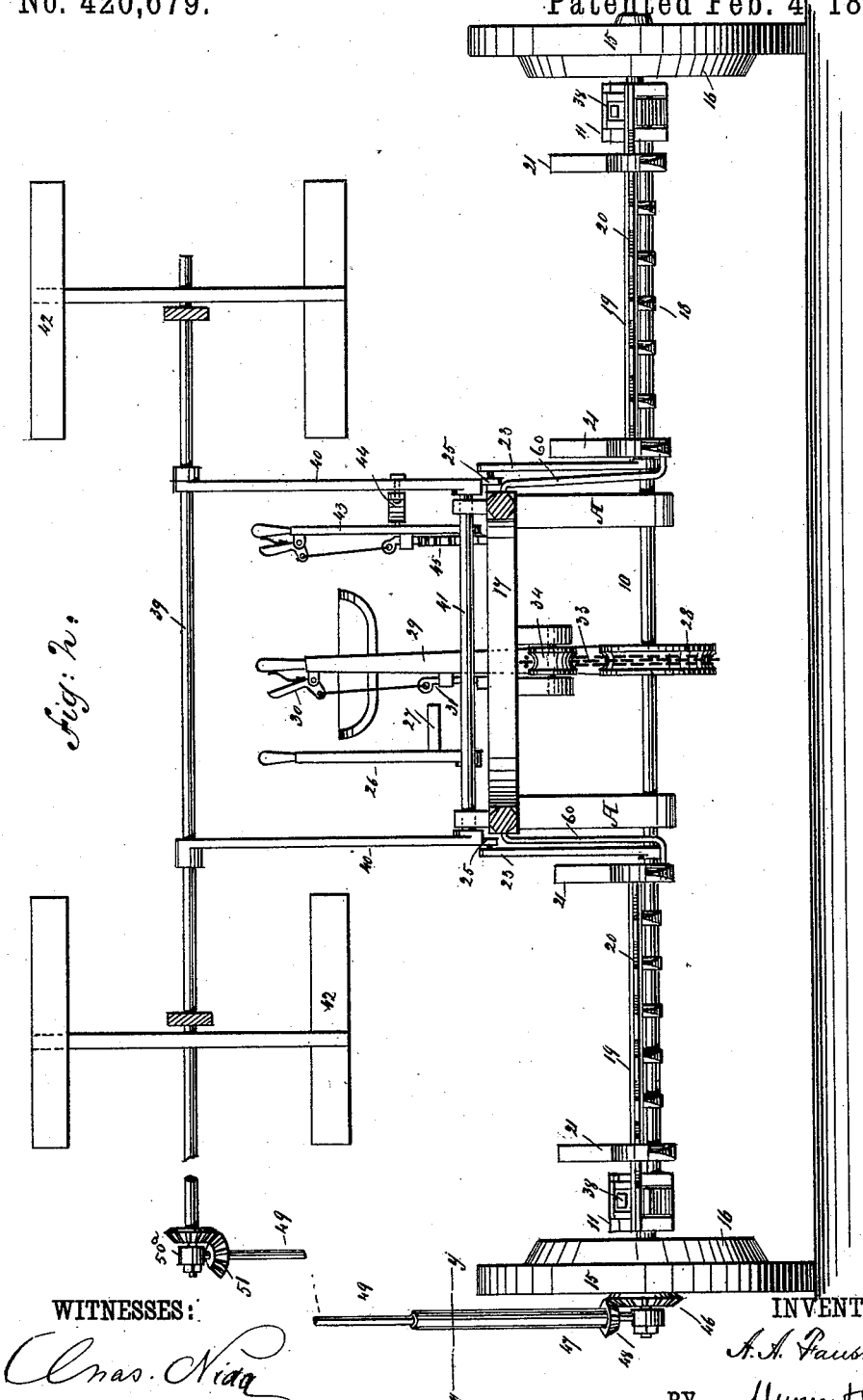
Figure 3:
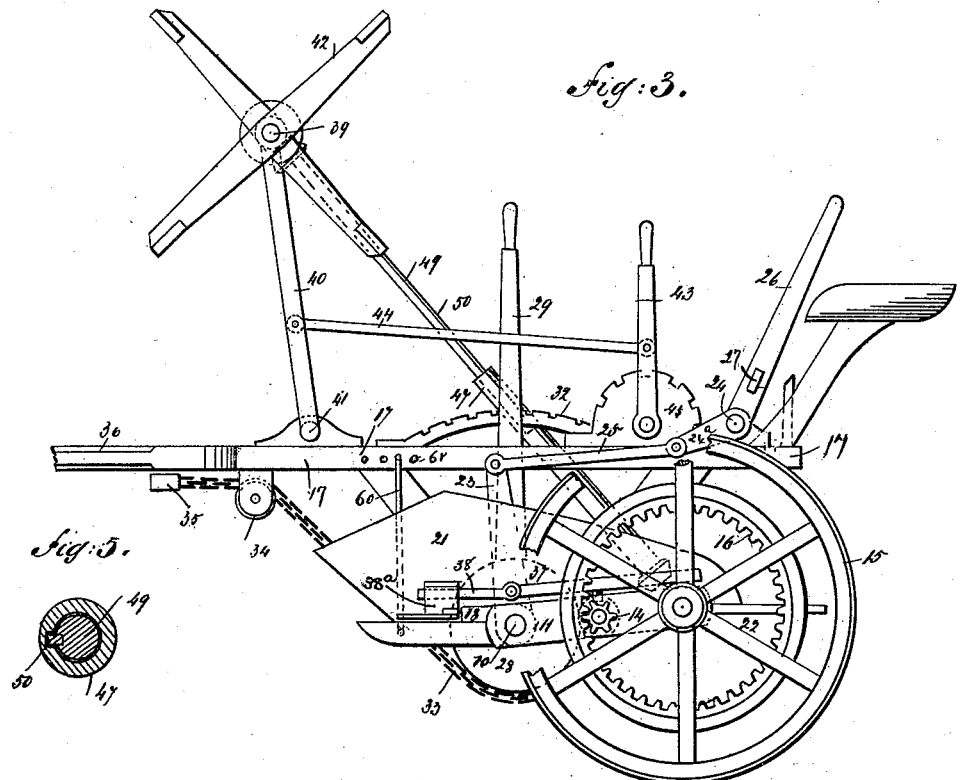
Figure 4:
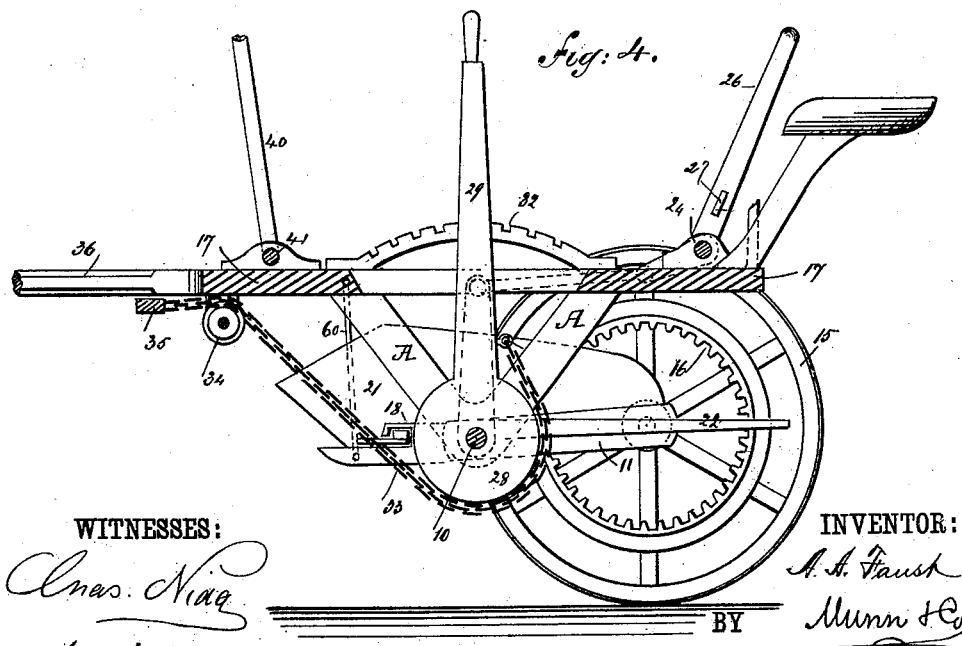

Figure 1 is a plan view of the machine. Fig. 2 is a front elevation. Fig. 3 is a side view. Fig. 4 is a transverse section on line $x\ x$ of Fig. 1, and Fig. 5 is a detail section on line $y\ y$ of Fig. 2.

The prime object of the invention is to provide a simple and effective machine for harvesting corn, and to that end the machine is provided with a pair of cutter-bars and finger-guard bars mounted upon axles supported by two drive-wheels which impart motion to the cutter-bars and devices for feeding the stalks to the cutters, and carrying and dropping them after they are cut.

In carrying out the invention the frame is composed of two forwardly-projecting blocks or castings 11, which, for convenience, I denominate "boxes," a main shaft 10, which may be tubular, if desired, mounted in the front ends of and connecting the boxes, stud-axles projected from the rear ends of the boxes, drive-wheels 15, journaled upon said axles, and a platform 17, pivoted upon the center of the main shaft. The platform is held in a horizontal position by the animal drawing the implement when harnessed in the thills 36, and the boxes 11, which are fast to the main shaft, are supported in a like position by a lever 29, rigidly secured to the main shaft in the manner hereinafter described, which lever, extending up through a slot in the platform, is adapted to engage with a segmental rack 32, attached to the upper face of the platform, as best shown in Figs. 1 and 4. From the outer side of the rear ends of the blocks or boxes 11 stud-axles are projected, upon which axles the drive-wheels 15 are journaled, the said drive-wheels being provided upon their inner surface each with an internal gear-wheel 16. The said blocks or boxes 11 are recessed longitudinally from a point at or near the center in the direction of the rear end, and a second recess is also produced in the forward end.

The main shaft 10 is connected with the blocks or boxes 11 at their forward or recessed end, the said end being keyed or otherwise solidly attached to the said shaft.

At the center of the main shaft 10 the platform 17 is pivoted, which is adapted for the accommodation of the driver, whose seat is at the rear, and from which the machine can be conveniently operated and controlled. The platform consists of a horizontal body, from the under side of which bracket-like standards A are projected downward, having suitable aligning apertures in their lower extremities for the reception of the main shaft 10. At or near the center of the boxes 11 a transverse short shaft is journaled, one end whereof projects outward in the direction of the drive-wheels, and upon said projecting end of the shaft a pinion 14 is secured, which pinion meshes with a gear 16, integral with the drive-wheel. Within the boxes, upon the short shaft journaled therein, a pulley or small wheel 12 is keyed or otherwise attached, provided with a circumferential cam-slot 13.

At each side of the platform 17 and the side boxes 11 finger-bars 18 are pivoted upon the main shaft 10 through the medium of rearwardly-extending apertured lugs 18ª—one lug at each end—the outer lug being pivoted upon the main shaft within the forward recesses of the boxes 11. The cutter-bars 19 are of usual construction and are held to reciprocate upon the finger-bars 18, being supported thereby and provided with triangular cutters 20. Transverse vertical shields 21 are attached to the finger-bars 18—one near each end—which shields project forwardly and rearwardly upon the same, one shield being located near the platform 17 and the other near each box 11, the purpose whereof is to prevent the stalks from scattering when cut by the knives 20.

To the inner sides of the forward end of the finger-bars 18 rods 60 are attached, which rods extend upward for engagement, respectively, with one of a series of holes 61, as best shown in Fig. 3, in the sides of the platform 17, by means of which rods the angle of the finger-bars 18 can be regulated and the said finger-bars held in a fixed position relative to the ground.

At the rear of each of the finger-bars 18 a slotted table 22 is pivoted upon the main shaft 10, through the medium of apertured lugs 22ª, formed upon the forward side of said table at the ends, the inner lug being integral with a vertical standard 23, which standard extends upward at a right angle from the lug.

Transversely to and upon the platform at the rear a rock-shaft 24 is journaled in suitable bearings, said shaft having crank-arms 24ª integral therewith, extending downward outside of the platform 17, and connected with the table-standards 23 by connecting-rods 25. Thus by the manipulation of the rock-shaft 24 the tables 22 may be raised or lowered to dump or to retain the cut stalks, as desired. The manipulation of the rock-shaft is preferably effected by means of an attached lever 26, projecting vertically upward conveniently to the driver's seat, and provided with an arm 27 at a right angle thereto, whereby the shaft 24 may be rotated either by foot or by hand, as found most convenient.

The lever 26 is so constructed that when it is drawn back to elevate the tables 22 a dead-lock is obtained, which is accomplished by carrying the lever 26 farther back than shown in the drawings, whereby the crank-arms 24ª are carried above the center of the rock-shaft 24, effecting the lock, the lever being prevented from falling back and dropping upon the tooth by any approved form of stop, which may be secured to said table.

Upon the main shaft 10, centrally of the same and beneath the platform, a grooved wheel 28 is keyed or otherwise secured, having attached to the upper periphery a lever 29, which lever, extending vertically upward through an opening in the platform 17, as heretofore stated, is provided with an ordinary spring-actuated auxiliary lever 30 and attached pawl 31, adapted to engage a suitable rack 32, secured to and extending upward from the platform 17, as best illustrated in Fig. 2. By means of this lever 29 the main shaft 10 can be rotated or rocked in the standards A under the platform 17, and as the said shaft is rigidly secured to the front end of the boxes 11 and the rear ends of said boxes 11 are fulcrumed in the drive-wheels 15 the forward or the rearward movement of the lever 29 will raise or lower the front ends of the boxes 11 and shaft 10 sufficiently to enable the finger-bars 18, which are connected with the shaft, as set forth, and with the boxes 11, to clear the obstruction in front of them and be brought down to their normal position. This grooved wheel serves another purpose, as directly therefrom the draft is made. This purely central draft, which enables the machine to turn readily, is obtained by attaching a chain 33, the lower end of the lever 29 carrying said chain down around the wheel, in the groove, over the friction-roller 34, mounted under the platform 17 at the front, and securing the end to the whiffletree 35.

I preferably employ a single horse to draw the machine, and to that end make the thills 36 an integral portion of the platform 17, and the draft-chain is therefore led out centrally between the thills 36, as illustrated in Fig. 1.

The cutter-bars are reciprocated by means of horizontal levers 37, the rear ends of which levers are pivoted to the rear end of the boxes 11 upon their upper sides, and the reciprocating levers 37 are each provided with a pin centrally located upon their under faces, this pin being adapted to enter into the cam-slot 13 in the wheels or pulleys 12, and as the pulleys 12 are revolved the said pins travel in the cam-slots 13 and the levers 37 are caused to reciprocate. Each reciprocating lever is provided at its forward end with a hinged section 38, as shown in Fig. 1, the forward ends of which hinged sections are secured to the heads of the cutter-bars 19 by being passed into a box 38ª, which constitutes the heads of the said cutter-bars. The hinge or joint at the forward end of the reciprocating levers 37 permit the said levers to adjust themselves to the angle of the finger-bars when the machine is raised or lowered.

In front of the knives 20, some distance above them, a reel-shaft 39 is supported by arms 40, formed upon the ends of a shaft 41, which shaft is journaled in bearings at the forward end of the platform 17.

Upon the shaft 39 reels 42 are secured in transverse alignment with the cutter-bars 19 and dumping-tables 22, and the said shaft 39 is raised or lowered by means of the lever 43, pivoted to the platform 17 and connected with one of the arms 40 by a connecting-rod 44.

The lever 43 is provided with an attached spring-actuated auxiliary grip or pawl lever, as shown in Fig. 2, to engage with the curved notch bar or rack 45, secured to the platform 17, and designed for holding the reel-shaft 39 in any desired position.

The reel-shaft 39 is rotated by means of a bevel-gear 46, secured to one of the drive-wheels 15, and a short tubular shaft 47, stepped upon the stud-axle contiguous to the gear 46, which shaft at its lower end is provided with a bevel-pinion 48, meshing with the gear 46.

In the upper end of the tubular-shaft 47 one end of a solid vertical shaft 49 is entered, the two shafts being held to revolve in unison by means of a feather 50, formed upon the solid shaft 49, entering the corresponding groove in the tubular shaft 47, as shown in Fig. 5. The upper end of the solid shaft 49 is journaled in a collar 50$^a$ on the outer end of the reel-shaft 39, and near the pivoted point said shaft is provided with a bevel-pinion 51, meshing with a bevel-gear 52 upon the reel-shaft 39, as shown in Fig. 1. By reason of the sliding connection of these two shafts 49 and 47, which are the driving-shafts, and the lever 43, with its connections, the reel-shaft 39 may be raised and lowered without difficulty while in motion.

In operation, as the machine is drawn forward the lay of the corn is controlled by the reels on the shaft 39, and the cutters, being rapidly reciprocated, cut the stalks, which fall upon the tables 22. When a sufficient number of stalks have accumulated upon the tables 22, the said tables are lowered by raising the foot and pushing the controlling-lever 26 forward, whereupon the corn falls to the ground in sheaves. The controlling-lever 26, when pulled back to its place, forms a dead-lock, which retains the tables 22 in an elevated position, as has heretofore been described.

By reference to the drawings it will be observed that by reason of the draft-chain 33 being passed around the wheel 28, secured to the lever 29 in the manner shown, the horse or horses attached to the implement materially assist in the manipulation of the main shaft 10, when the lever 29 is drawn back to elevate the said implement. To further explain in this connection, the animal or animals drawing the machine assist the operator to throw the lever 29 back to be locked in the last notch of the rack 32, since the chain 33 is lengthened when the lever 29 is drawn back and shortened when the said lever is pushed forward; or, in other words, the chain is unwound when the lever 29 is thrown backward by the operator and is wound up again when the said lever is pushed forward. In this way the lever acts directly in raising and in lowering the implement.

I claim—

1. In a corn-harvester, the combination, with the wheels 15, the side boxes 11, pivoted by stub-axles therein, the main shaft 10, secured in the front ends of the boxes, a platform journaled on the said shaft, finger-bars 18, pivoted on the said shaft, means to adjust the angle of said bars relative to the platform, transverse shields 21, attached to said finger-bars, and cutter-bars carried thereby, of a lever rigidly secured centrally upon the shaft, and means, substantially as shown and described, for locking the lever in different positions to the platform and reciprocating the cutter-bars from the drive-wheels, as and for the purpose specified.

2. In a corn-harvester, the combination of the wheels 15, the side boxes 11, pivoted by stud-axles therein, the main shaft 10, secured to the front ends of the boxes, the finger-bars 18, pivoted on said shaft near the ends, carrying cutter-bars, transverse shields 21, attached to said finger-bars, and slotted tables 22, pivoted on the main shaft to the rear of the finger-bars, a platform located between the finger-bars and pivoted on the shaft, a lever 29, rigidly attached centrally to the shaft and projecting upward through the platform, a rock-shaft 24, journaled transversely on the platform at the rear, standards attached to the tables, a connecting-rod uniting the standards and rock-shaft, a combined foot and hand lever secured to said rock-shaft, and means for supporting the forward edge of the finger-bars, substantially as shown and described, whereby tables may be elevated and depressed from the platform, as set forth.

3. In a corn-harvester, the combination of the wheels 15, the side boxes 11, pivoted therein by stud-axles and having journaled therein cam-grooved wheels 12, the main shaft 10, secured in the front ends of the boxes, the drive-wheels provided with internal gear-wheels 16, pinions 14 upon the cam-wheel shafts meshing in said gear-wheels 16, finger-bars 18, pivoted on the shaft 10 and provided with shields 21, cutter-bars 19, sliding in said finger-bars, horizontal hinged levers 37, pivoted upon each box 11 and provided with pins entering the cam-grooves of the wheels 12, the levers 38, pivoted to the levers 37 and attached to the cutter-bars, and means for rocking the main shaft and supporting the forward edge of the finger-bars, substantially as shown and described, whereby the cutter-bars can be raised and lowered while the machine is in motion, as set forth.

4. The combination of the wheels 15, the boxes 11, carrying the main shaft 10, finger-bars 18, pivoted upon said shaft near the ends and provided with shields 21, carrying cutter-bars, a platform 17, pivoted upon said shaft between the finger-bars, an adjustable connection between said finger-bars and platform, a lever 29, rigidly secured centrally to the main shaft, extending upward through the platform and having adjustable connection therewith, tables 22, pivoted upon the shaft to the rear of the finger-bars, a rock-shaft pivoted upon the platform and connected with the tables, means, substantially as described, for reciprocating the cutter-bars from the drive-wheels, a reel-shaft 39, carrying reels 42, a transverse shaft 41, having arms 40, supporting said reel-shaft, a lever 43, fulcrumed upon the platform and connected with one arm 40, and means, substantially as described, for rotating the reel-shaft from the wheel-axles, all operating as herein set forth.

5. The combination, in a corn-harvester essentially as herein described, of its drive-wheels, a bevel-gear secured upon the outer face of one of said drive-wheels, a reel-shaft 39, carrying reels 42 and provided with a bevel-gear 52, a transverse rock-shaft 41, journaled upon the frame, having arms 40, supporting the reel-shaft, a lever 43, fulcrumed upon the frame and connected with one arm 40, a tubular shaft 47, stepped upon one axle of the harvester and provided with a longitudinal interior groove and carrying a pinion 48, meshing with the axle-gear, a solid shaft 49, provided with a feather sliding in the tubular shaft and journaled on the reel-shaft, and a bevel-pinion 51 upon the upper end of the shaft 49, meshing with the gear 52, substantially as shown and described, whereby the reel-shaft is rotated from the drive-wheels by a compensating connection, as set forth.

ADOLPH A. FAUST.

Witnesses:
MOSES YOUNG,
A. C. HARRIMAN.